Oct. 6, 1964 H. E. RIORDAN 3,151,623

PNEUMATIC COMPUTER ELEMENT AND CIRCUITS

Filed Nov. 28, 1962 3 Sheets-Sheet 1

HUGH E. RIORDAN
INVENTOR.

BY S. A. Giarratana
Francis L. Masselle

ATTORNEYS

PNEUMATIC COMPUTER ELEMENT AND CIRCUITS

Filed Nov. 28, 1962 3 Sheets-Sheet 2

HUGH E. RIORDAN
INVENTOR.

BY S.A. Giarratana
Francis L. Masselle
ATTORNEYS

PNEUMATIC COMPUTER ELEMENT AND CIRCUITS

Filed Nov. 28, 1962 3 Sheets-Sheet 3

HUGH E. RIORDAN
INVENTOR.

BY S. A. Giarratana
Francis L. Masselle
ATTORNEYS

United States Patent Office 3,151,623
Patented Oct. 6, 1964

3,151,623
PNEUMATIC COMPUTER ELEMENT AND CIRCUITS

Hugh E. Riordan, Wyckoff, N.J., assignor to General Precision Inc., Little Falls, N.J., a corporation of Delaware Filed Nov. 28, 1962, Ser. No. 240,613
8 Claims. (Cl. 137—112)

The present invention relates to a pneumatic computer element and to pneumatic computer circuits, and more particularly to a pneumatic computer element having a number of stable operational positions, and to pneumatic computing circuits performing digital computation functions.

It is well known that all digital computation functions can be performed by appropriate combinations of bistable elements or "flip flops." The basic digital operations are counting, switching, and memory. In addition, conversion between analog and digital forms of intelligence is frequently required. The concept of a bistable element can be implemented in a variety of ways, so that the two states may be accomplished by switching, i.e., by conducting versus non-conducting, by using an oscillator in oscillating versus not oscillating states and a storage element may be bistable in full versus empty positions. Further, bistable devices can be combined into components which perform specific arithmetic, logic, or memory functions.

The bistable element may comprise a cylinder with a ball or other form or piston adapted to operate between two stable positions and is pneumatically controlled by four external connections. The tristable element is merely a modification of the bistable element with the addition of a fifth pneumatic external connection to obtain a third stable state for performing more complex operations in logic than the bistable element.

The present invention in its preferred form comprises a shuttle or piston member in a cylinder having two axial openings each incorporating an opening seat which can mate with the piston member and provide a closure for the respective axial opening, and a plurality of side connections in the cylinder. The piston is provided with a sufficiently good fit in the cylinder so that a leakage area is provided past the piston which is not too large compared with the area of any of the axial openings and side connections. The piston can be a cylinder with or without seal rings, a spool, a ball or any other form which permits piston action within the cylinder and also provides closure of the axial end openings at the extremes of travel.

Generally speaking, therefore, the basic element of the present invention comprises a cylindrical housing having a movable ball member adapted to assume a plurality of stable positions in response to the selective control of a pneumatic input and output system utilizing flow restriction means and flow closure means to control the position of the ball member, and, in turn, the flow or pressure signals transmitted by the embodiment. In this manner, pneumatic computing circuits are derived which perform specific arithmetic, logic, or memory functions. Specifically, logic circuits which change state as a result of specific combinations of inputs, such as, "and," "or," "nor," and "not" circuits are readily obtained which can be utilized, for example, in hot gas operated guidance and control equipment for application to hypervelocity vehicles. Other functions which may be derived from multistable elements are shift registers and memory banks. To explain the inventive concept, a pneumatic bistable element is illustrated which consists of a ball moving freely but not loosely in a cylindrical housing having four tubular connections. The two stable positions of the ball are in the extreme ends of the housing in a juxtaposed position with respect to the two axial tubular connections.

A modification of the foregoing embodiment is obtained by adding a fifth tubular connection to the cylindrical housing near the center of the cylinder thereof, a third stable state is thereby obtained, and the device is capable of relatively more complex operations in logic. In the operation of a tristable element, the input is provided by the closure or application of pressure to designated input connections and the outputs will be pressure pulses appearing at discrete connections. It should be understood that a pulse of back pressure applied to an input connection is in effect a momentary closure since it inhibts flow through the connection. The output is a pressure differential across on or both of the supply orifices provided between a pneumatic supply and each of the axially aligned connections. Alternatively, the device may be so connected as to serve as a valve opening or closing a passage through which fluid may pass from some external supply. The normal or neutral state of the element is with all input connections in use open to the atmosphere, or to a passage at some reference pressure substantially lower than the supply pressure while a connection is not in use if it is permanently closed.

Therefore, an object of the present invention is a provision of a pneumatic computer element applicable for use in a hot gas operated guidance and control system requiring high temperature capabilities and having high response speed and accuracy requirements.

Another object is to provide a pneumatic computer element capable of performing basic digital operations.

A further objects of the invention is the provision of a pneumatic computer element having a number of operational stable positions enabling the device to perform all digital computation functions.

Still another object of the present invention is a provision of pneumatic computing circuits utilizing multi-position stable elements performing digital computations.

Yet another object is to provide pneumatic computing circuits having pneumatically controlled multi-position stable elements forming logic circuits which change state as a result of specified combinations of inputs to the elements.

The invention also contemplates the provision of computing circuits having pneumatically controlled bistable elements performing digital computation functions.

Yet another further object of the invention is to provide computing circuits utilizing pneuamtically controlled tristable elements performing digital computation functions.

Other objects and many of the attendant advantages of this invention will be readily appreciated as the same becomes better understood by reference to the following detailed description when considered in connection with the accompanying drawing in which like reference numerals designate like parts throughout the figures thereof and wherein.

Figure 1:
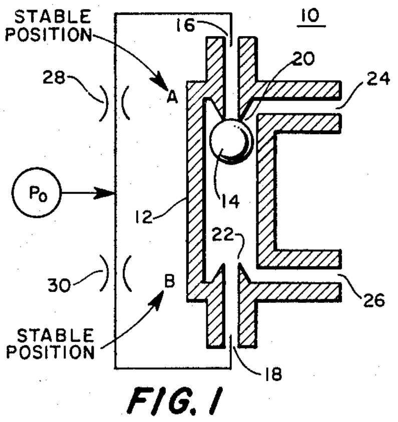
FIGURE 1 is a schematic view of a preferred embodiment of the invention showing a bistable element providing a pneumatic computing circuit having a continuous output requiring no interrogating signal.

Referring now to the drawing, there is illustrated an element 10 forming the basic computing circuit. This element comprises a cylinder 12 provided with four tubular connections and with a ball member 14 movable therein. The tubular connections consist of two axial connecting means 16 and 18, each formed with an integral valve seat 20 and 22, respectively, which may protrude into the cylinder a predetermined amount, or which may be essentially flush as shown at 42 in FIGURE 3. Radial or side connections 24 and 26 are provided opening into the cylinder adjacent valve seats 20 and 22, respectively. It is essential that the radial connections 24 and 26 at the ends of the cylinder communicate with the annular volume trapped between the ball and the cylinder head when the ball is at either end of the cylinder. In addition, if maximum speed of response is desired, the ratio of total projected area of the ball to the projected area of the ball subtended by the end opening and seats 20 and 22 should be as large as practical. The two stable positions of the ball member are designated by the letters A and B representing the position of the ball when in contact with the valve seat 20 or 22. A suitable pneumatic supply at a pressure $P_0$ is provided connected to the axial openings 16 and 18 through suitably designed flow restricting supply orifices 28 and 30. In the operation of element 10, a suitable fluid is transmitted through the flow restriction means 28 and 30 and their respective connections 16 and 18 to the cylinder 12 at a suitable pressure $P_0$, and radial connections 24 and 26 are open to the atmosphere. Assuming that the ball member 14 is initially at stable position A, connection 16 is closed by the ball member so that little on no flow occurs through the supply orifice 28 and the pressure at 16 is essentially equal to the supply pressure $P_0$. However, fluid flow is present through the supply orifice 30 and through connection 18. Hence, the flow path, with the ball 14 in the stable position A, is through the valve seat 22 out through the radial connection 26.

Since the ball 14 does not form a leak-tight fit in the cylinder 12, a small predetermined flow passes around the ball and out through the radial connection 24. Accordingly, because of the fluid flow through the supply orifice 30, there is a pressure drop $\delta$, across the orifice, and the pressure at 18 is $P_0-\delta$, in other words, the supply pressure minus the pressure drop across the supply orifice 30. Now, if the radial connection 24 is closed, pressure in the cylinder 12 on both sides of the ball member will equalize because of leakage past the ball. However, there will remain the force acting on the valve seat 20 which will move the ball away from the stable position A. Hence, as soon as the seal between the ball and valve seat 20 is broken, the supply pressure of the flow through connection 16 acts on the entire ball area, and the ball is driven rapidly to the stable position B. Next, if the connection at 24 is reopened, the ball will remain at stable position B under conditions of equilibrium similar to those which existed initially when the ball was at stable position A, except that there will now be a relatively large fluid flow out of 24, a small fluid flow out of 26, and pressure $P_0-\delta$ at 16. In other words, the pressure at 16 is equal to the supply pressure minus the pressure drop at the orifice 28. Accordingly, the momentary closure of the radial connection 24, causes the preferred embodiment to reverse its pressure and fluid flow states. A momentary closure of the radial connection 26 will cause the ball member to return to stable position A and remain there. Hence, it is obvious that the preferred embodiment 10 exhibits the properties of a true bistable element.

Figure 2:
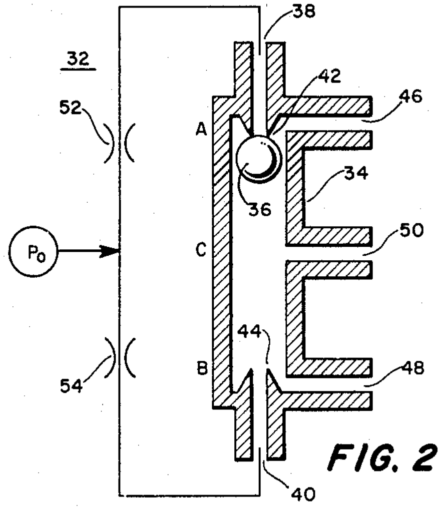
FIGURE 2 is a cross-sectional view of a modification of the device of FIGURE 1, showing a tristable element.

FIGURE 2 discloses a modification 32 of the preferred embodiment 10, comprising a cylinder 34 provided with a movable ball 36, and formed with axial connections 38 and 40 having valve seats 42 and 44, respectively. The cylinder is provided with radial connections 46 and 48 radially extending from the ends of the cylinder adjacent valve seats 42 and 44, respectively. In order for the device to be capable of relatively more complex operations in logic, a fifth radial connection 50 is provided at substantially the center of the cylinder, so that a third stable state can be obtained. Thus, the modification 32 is provided with three stable positions indicated in FIGURE 2 by the letters A, B and C. The axial connections 38 and 40 are supplied through separate flow restriction orifices 52 and 54, respectively, from a common pneumatic supply at a pressure $P_0-\delta$. The radial connections 46, 48 and 50 are normally open to the atmosphere, as hereinafter discussed.

In the operation of the modification 32, considering first a condition in which the ball 36 is at stable position A, with radial connections 46 and 48 open, and the radial connection 50 closed. If the connection 50 remains closed, momentary closure of connection 46 will, as in the preferred embodiment, cause the ball to move to stable position B and remain there. If radial connection 50 is opened with the ball at stable position A, the additional pressure loss through 50 will permit the pressure on seat 42 to move the ball toward position C, at the center of the cylinder. When the ball has reached stable position C the conditions obtained are that the pressures at 38 and 40 are equal, and fluid flow out of 46 and 48 are also equal. The radial connection 50 is mostly blocked off by the ball, and since the pressure on both sides of the ball is equalized the ball will remain at stable position C. A disturbance tending to move the ball from the position C will result in a pressure differential across the ball in such a direction as to return it to the stable position C. That such a centering effect exists may be seen by considering the flow and pressure conditions in the unit before and after the application of a disturbing force such as, for example, would be developed by acceleration of the entire unit. Initially, with the ball centered over the opening 50, total flow out through the openings 46 and past the upper side of the ball through 50 will be essentially equal to the total flow out through 48 and past the lower side of the ball through 50. Since the supply orifices 38 and 40 are substantially equal and the geometry of the inlet passages 38 and 44 substantially identical, the pressures acting on the top and bottom of the ball are equal and the geometry of the inlet passages 38 and 44 substantially identical, the presesures acting on the top and bottom of the ball are equal.

If a disturbance tending to decenter the ball is now applied, for example, an acceleration of the unit in the downward direction, the ball moves upward relative to 50, uncovering a greater portion of 50 to flow passing the lower side of the ball from the lower end of the cylinder, and closing down the portion of 50 passing flow over the top of the ball from the top end of the cylinder. As the result of this movement of the ball, the pressure below the ball is reduced, and the pressure above the ball is increased so that there is a net effective force tending to restore the ball to its central position over 50. To move the ball to stable position A, the connection 50 is closed while radial connection 48 is momentarily closed. Conversely, to move the ball to stable position B, the radial connection 50 is closed while radial connection 46 is momentarily closed.

In brief, in the construction of a pneumatic bistable or tristable element, there are four controlling primary considerations, namely, size of the device permitted by the application, speed of response required, the magnitude of the output, reliability of operation, and the operating life of the device. In addition, the following aspects of the application of the present invention are important, namely, the operating temperature anticipated, the supply pressure, flow consumption, and the cleanliness of the fluid supplied. Further, the present invention is susceptible to techniques of construction which favorably affect the cost and ease of manufacture.

Figure 3:
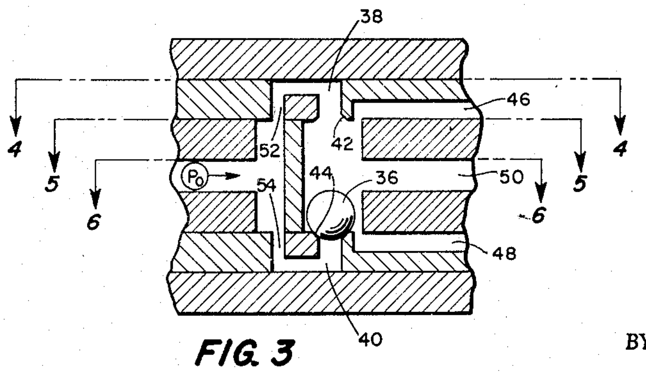
FIGURE 3 is a cross-sectional view of a modification of FIGURE 2 illustrating a preferred structural fabrication of the element.

For example, an actually fabricated tristable element, of the type illustrated by the preferred embodiment 32, is shown in FIGURE 3 to show the ease with which an accurate and economical digital computing element can be fabricated. The reference characters in FIGURE 3 designate corresponding parts shown in FIGURE 2. The tristable element 32 is assembled as a multilayer sandwich of plates, herein six are shown, each suitably perforated and recessed, for example, to provide integral orifices and axial and radial connections. If desired, the need for routing or recessing can be eliminated by using nine instead of six plates in the assembly of the modification 32. To obtain satisfactory seals between the ball member and the valve seats 42 and 44, the plates, if made of metal, are left with a sharp edge when manufactured, so that after a few cycles of operation, the ball 36 will coin a satisfactory seat. If a ceramic construction is utilized for the modification 32, a thin layer of metal may be deposited on each valve seat to provide a deformable medium which will allow the ball to seat itself. It will be obvious that the ball should be made of a hard low density material, such as sapphire, pyroceram, sintered alumina, or the like. The various plates are fabricated into a unitary structure by suitable and well known production techniques. Obviously the above described construction features and techniques may be equally applied to the bistable element 10 or any similar device or combination of devices.

Figure 4:
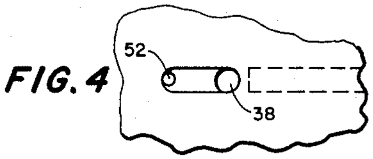
FIGURE 4 through FIGURE 6 are sectional views of the device of FIGURE 3, showing the relationship of the various connections to the cylinder.
Figure 5:
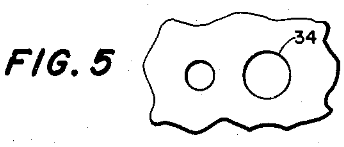
Figure 6:
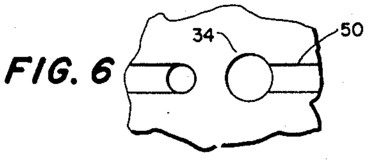

FIGURES 4 through 6 illustrate the relationship of the supply orifice 52 with the axial connection 38, the relationship between the diameter of the cylinder 34 and the diameter of the pneumatic supply conduit, the relationship between the radial connection 50 with the diameter of the cylinder 34 and the pneumatic supply conduit. Additionally, the ball must be of sufficiently good fit in the cylinder 34 so that the leakage area past the ball is not too large compared with the cross-sectional area of any of the radial connections or the axial connections. If desired, the ball member may be a cylinder with or without seal rings, a spool member, or any other suitable form which permits piston action combined with closure of the valve seats at the extremes of travel. The length of the cylinder should be kept as small as possible to reduce transit time of the ball member.

In the present invention, the diameter of the cylinder is determined by the relationship between leakage past the piston and the minimum practical sizes of the flow restriction orifices. For example, considering at a leakage area ratio of 0.25 is a reasonable criterion, that the minimum feasible passage diameter is 0.006 inch, that sphericity and diametral tolerances on balls are about $10^{-5}$ inch and that cylinder roundness and diametral tolerances are $10^{-4}$ inch, a suitable cylinder diameter is 0.022 inch.

The basic transit time is given by the formula:

$$T=\frac{2X\gamma B}{1.5p}$$

where

X is equal to ball travel,
$\gamma$ is equal to ball density,
B is equal to ball diameter, and
$p$ is equal to the differential pressure.

Now, if X is made equal to one ball diameter, when the cylinder length is equal to two balls' diameters, for a sapphire ball having a density of $$\frac{0.142}{386}\text{ lb. sec.}^2/\text{in.}^4$$

$T$=0.22 millisecond for a differential pressure of 5 p.s.i. Since the transit times is reduced as the square root of the increase in differential pressure, an increase of pressure differential to approximately 100 p.s.i., which is entirely feasible, would reduce T to 49 microseconds which is within the range used for bistable circuits in electrical computers.

The structural unit comprising the modification 32, shown in FIGURE 3, has a volume of $2.16\times10^{-4}$ in.$^3$. The nominal packaging density is therefore 4,640 units per cubic inch. Allowing 100 percent overage for connections, the density will be 2,320 units per cubic inch. This means that a 2,000 word 10 bit memory, equivalent to a medium size general purpose digital computer using bistable elements, as shown in FIGURE 1, would require 8.6 cubic inches or a 2.04 inch cube. Doubling this volume to allow for read-in and read-out circuitry results in a total of 15.2 cubic inches. For example, a medium size digital computer has approximately 2,200 tubes and 4,000 diodes or a total of 6,200 active elements, assuming a one for one equivalence with the pneumatic tristable element, the resulting volume for a pneumatic computer of an equivalent capacity is 2.73 cubic inches. Adding the volume of the memory of a pneumatic digital computer of a capacity equivalent to the medium size digital computer gives 17.9 cubic inches or a cube 2.6 inches on a side. Assuming that the estimate of the size of the configuration is off by a factor of 10 on the linear dimensions, the volume of the disclosed pneumatic computer would still be only 17,900 cubic inches or a cube 26 inches on a side.

Considering now the operation of pneumatic computing circuits, in general, the circuit formed by element 10 is used as a memory or storage circuit which exhibits a detachable equilibrium state dependent on the character of the last input before interrogation. This storage circuit utilizes the multi-position stable member 10 with a continuous output requiring no interrogation signal. Specifically, the axial connection 16 serves as the output while radial connections 24 and 26 are the inputs. Or, the circuit of FIGURE 1 may be considered as the circuit of FIGURE 2, but with radial connection 50 permanently closed. Accordingly, if the last input, i.e. momentary closure or pressure pulse, is applied to the connection 26, the output at 16, with the ball member juxtaposed to the seat opening 20, is zero. Hence, if the radial connection 26 is momentarily closed, there is no pressure pulse through the axial connection 20 since the axial connection is closed by the ball 14. Thus, no flow occurs through the supply orifice 28 and the pressure at 16 is equal to the supply pressure $P_o$.

As previously explained, with radial connection 24 momentarily closed, the pressure within the cylinder on both sides of the ball will equalize because of the leakage past the ball. There remains however the force acting at the valve seat 20 which will move the ball away from the stable position A. As soon as the seal between the ball and valve seat is broken, the supply pressure acts on the entire ball area, and the ball is driven rapidly to the stable position B. When the connection 24 is reopened, the ball will remain at B, under conditions of equilibrium similar to those which existed with the ball at position A, except that there will now be a relatively large flow out of 24, a small flow out of 26, supply pressure at 18, and the pressure at 16 equal to the supply pressure minus the pressure drop across the supply orifice 28. Thus, the momentary closure of connection 24 causes the element 10 to reverse its pressure and flow states. A momentary closure of radial connection 26 will cause the ball to return to A and remain there.

FIGURE 2 is a modification 32 of the pneumatic computing circuit formed by element 10, adapted for use as an "and" circuit. The basic circuitry of FIGURE 1 is retained with a modification of the inputs and the addition of the connection 50. In this modification, the connection 46 is permanently opened and the inputs are applied at connections 48 and 50, while the output, or pressure pulse, is obtained at axial connection 38 as a pressure drop or at 40 as a pressure use. In this manner, a pressure pulse or amplitude $\delta$, equivalent to the pressure drop across the supply orifice 52 appears if and only if inputs, momentary closure of the connections, are applied simultaneously to connections 48 and 50. In this manner, an "and" circuit is obtained wherein a simultaneous closing of connections 48 and 50 results in a pressure change equal to the pressure drop across the supply orifice 52 at the connection 38. Said pressure change persists for approximately the period of time during which the inputs are applied to 48 and 50. It should be clear, that if radial connection 50 is opened as are connections 46 and 48, with the ball at A, the additional pressure loss will permit the pressure at the valve seat 42 to move the ball to position C at the center of the cylinder. With the ball at C and connection 46 permanently opened, before momentary closure of connections 48 and 50, the ball will remain at C since the pressures at 38 and 40 are equal and the flows out of 46 and 48 are equal with connection 50 mostly blocked off by the ball, the pressure on both sides of the ball is equalized and the ball will remain at C. Hence, a momentary closure of 48 and 50 simultaneously will cause an unbalancing of the pressures at 38 and 40 since there will be a pressure drop across the supply orifice 52 and the ball will move to the position A. However, as soon as the input or momentary closure of 48 and 50 is removed, the ball will return again to the stable position C. Thus, an output occurs at 38 if and only if input signals are applied to 48 and 50 simultaneously.

Figure 7:
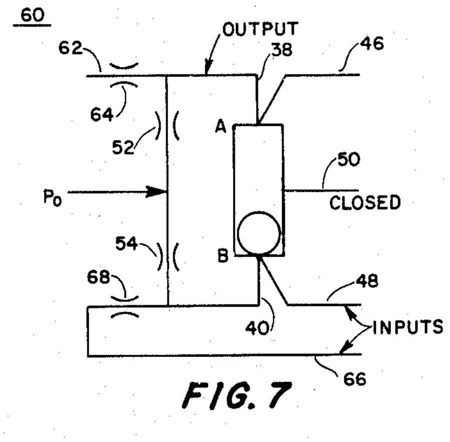
FIGURE 7 through FIGURE 11 are schematic views of pneumatic computing circuits performing logical operations.

FIGURE 7 illustrates a modification 60 of the basic pneumatic computing circuit, wherein two additional orifice discharges are added to the supply circuit. Accordingly, the connection 38 is supplied with an outlet connection 62, normally open to the atmosphere between the orifice 52 and the valve seat 20. A flow restriction orifice 64 is provided on the connection 62 adapted to provide thereto the proper built-in flow restriction. The connection 40 is provided with an input connection 66 formed with a flow restriction orifice 68.

Specifically, the "or" circuit used in computing is the non-exclusive "or." That is, an output appears if either input is energized or if both inputs are energized. The "or" circuit of FIGURE 7 therefore differs from the previous circuits formed by elements 10 and 32 in that two additional orifices discharges 62 and 66 are added to the supply circuit. By suitable selection of orifice coefficients, closure of either the new connection 66 or connection 48 can be made to shift the ball to the stable position A. Also, closure of both connections 48 and 66 will cause a shift of the ball to stable position A. Movement of the ball to A will produce a pressure use at 38, the output take-off. The connection 50 is permanently closed and 46 is permanently opened. Thus an output appears if either 48 or 66, or if 48 and 66 receive inputs, that is, are closed or subjected to a pressure input.

The suitable selection of orifice coefficients with regard to FIGURE 7 may be accomplished as follows:

With regard to the embodiment of FIGURE 7, the orifices 52, 64, 54, and 66 are so proportioned as to provide the following pressure and force relationships, where:

$A_B$ is the projected area of the ball.

$A_S$ is the projected area of the seat.

$P_{38}$ and $P_{40}$ are the respective pressures at 38 and 40.

Condition: Ball at B; 66 and 48 open.

$$P_{38}A_B > P_{40}A_S$$

$$A_B P_{38} < P_o A_S$$

by virtue of drop across 52 due to flow through 62 and 46.

$P_{40}$ is established by the drop across 54 due to flow through 66 and 68.

Condition: Ball at B; 48 closed, 66 open.

The pressure on both sides of the ball equalizes because of leakage past the ball. This leaves only the force $P_{40}A_S$ forcing the ball toward A.

Condition: Ball at B; 48 open, 66 closed.

$$P_{40} = P_o$$

since there is no flow through the orifice 54.

Since, as mentioned above, $$P_{38}A_B < P_o A_S$$

The ball is forced away from the seat toward position A.

Furthermore, the controlling device connected to 48, when open, should be more restrictive of flow than is orifice 54. Return of the ball to B upon removal of all inputs to 66 and 48 is assured by making 54 slightly more restrictive to flow than 52, so that with the ball at A and 48 and 66 open, $P_{38}A_S > P_{40}A_B$.

The symbolic expressions $$P_{38}A_B > P_{40}A_S \text{ and } A_B P_{38} < P_o A_S$$

by virtue of the drop across 52 due to flow through 62 and 46, hereinbefore given convey the design criteria governing the selection of pressures and orifices for the mode of operation described, i.e., the form in which the design specifications are given to the circuit designer and builder. This means that in constructing the device, it is necessary to:

(A) Select the magnitude of $P_o$ on the basis of system requirements, power availability, speed of response, etc. or on any arbitrary basis.

(B) Select $A_S$ and $A_B$ on the basis of ease of construction and packaging density requirements. Select the mean size of orifices 52 and 54 to give reasonable flow through the unit. Then assuming the ball to be at A with 48 and 66 open, make 54 enough smaller than 52 to assure that $P_{38}A_S > P_{40}A_B$. Now, assuming the ball to be at B, perform the steps D and E.

(C) In order to assure completion of the switching cycle, it is necessary that the control orifices, 64, 52, 68 and 54 be so selected that $P_{40} < P_{38}$ when either 66 or 48 is closed and the ball is in transit between the ends of the cylinder.

(D) Select the size of orifice 64 so that $P_{38}A_B < P_o A_S$.

(E) Select the size of orifice 68 so that $A_B P_{38} > P_{40}A_S$.

Figure 8:
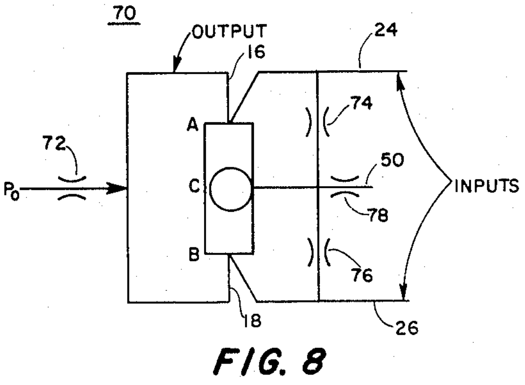

FIGURE 8 discloses a modification 70 of a basic computing circuit, wherein the flow restriction orifices 28 and 30 of the embodiment of FIGURE 1 are eliminated and a flow restricting orifice 72 is provided for the pneumatic supply $P_o$. Connections 24 and 26 are connected through substantially equal orifices 74 and 76, respectively, to connection 50, which, in turn, is provided with an orifice discharge 78. 78 is chosen of a size relative to 74 and 76 to assure that the position of the ball for 74 and 76 open is stable at the center of the cylinder, but that closure of either 24 or 26 will send the ball to one end of the cylinder. This selection is best determined empirically. Although not commonly used, the exclusive "or" circuit provides an output when either of two inputs is energized, but not when both are energized.

In the operation of the modification 70, the pneumatic supply is through a single orifice 72, while the output is the change in pressure drop across the orifice 72. Hence, when both 24 and 26 are open, pressure equalizes on both sides of the ball when it is centered at position C.

Because 50 is opened to the three orifices, the ball tends to remain centered as long as 24 and 26 remain open. The centering effect on the ball occurs for the reasons previously explained. Closure of 24 sends the ball to postion B. In either case, the flow through the supply circuit is halved, and a pressure rise appears at 16 and 18. Accordingly, an output appears if and only if either one but not both of the two inputs 24 and 26 receives a signal.

Figure 9:
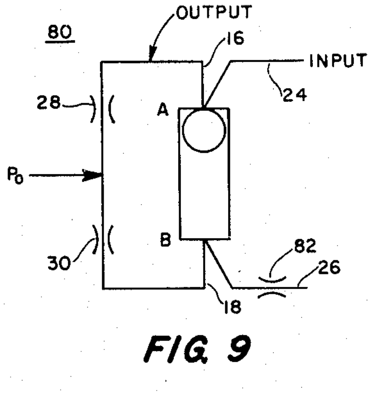

FIGURE 9 discloses a modification 80 of the basic computing circuit, wherein a flow-restriction orifice 82 is provided on connection 26. This modification results in a "not" circuit which gives no output when an input is applied through the connection 24 and gives an output only when no input is applied.

Figure 14:
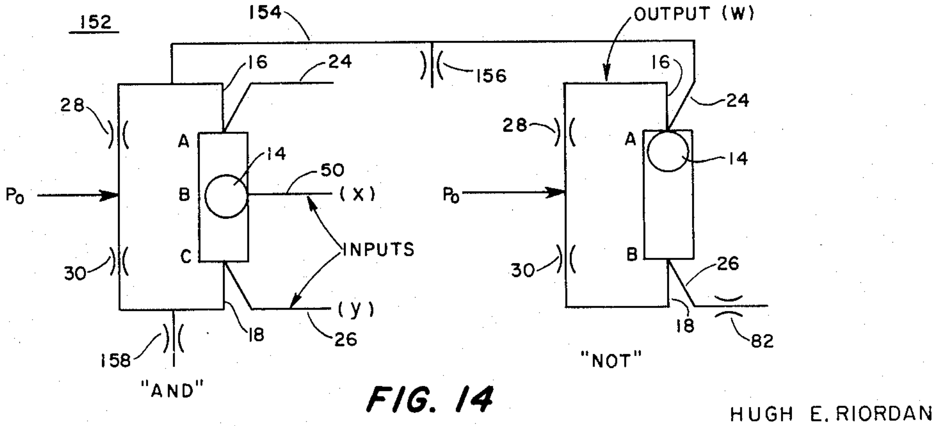
FIGURE 14 is a schematic view of a pneumatic computing circuit showing the interconnection of basic circuits to perform more complex digital computation functions.

The output is through connection 16, and connection 26 exhausts through orifice 82 while 24 is the input connection. The use of circuit 80 together with circuit 32 to form an "and not" circuit is illustrated in FIGURE 14 and described later. In the operation of modification 80, with no input at 24 the ball is at stable position A, and the pressure at 16 is the supply pressure $P_o$, which corresponds to maximum output. The ball remains at A because of the back pressure developed by the restricting orifice 82 on connection 26. When an input, i.e. a closing pressure use, is applied to connection 24, the ball moves to position B and the output pressure drops to the supply pressure minus the pressure drop, $P_o-\delta$, or the level which corresponds to no output. When the input is removed from the connection 24, the ball returns to A, and an output again appears.

Figure 10:
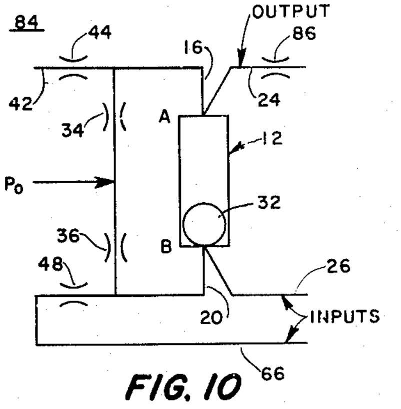

FIGURE 10 illustrates a "nor" circuit 84 structurally similar to the "inclusive or" circuit 60, but further modified by the application of a flow restriction orifice 86 on the connection 24. In effect, the "nor" circuit 60 is a "not" circuit with multiple inputs, so that an output appears only when no signal is applied to any of the inputs. It is obvious that a two input "nor" circuit can easily be constructed from a single bistable element.

In the operation of modification 84, the output or pressure pulse appears at connection 24. An input at either or both the connections 26 and 66 will cause the ball to move to position A. This operation closes off the connection 24 from the connection 16, which reduces the flow through the orifice 86 on the connection 24, and thus, causes the output pressure at 24 to drop off. When there is no input at 26 or at 66, the ball is at position B, and the flow from connection 16 passes through 24 giving an output.

In the selection of orifice coefficients for the embodiment of FIGURE 10, the principles relating to FIGURE 7 applying except that the output is taken from 24 instead of from 38. The addition of orifice 86 does not materially affect the behavior of the ball but serves as a load resistance across which the output signal appears.

Figure 11:
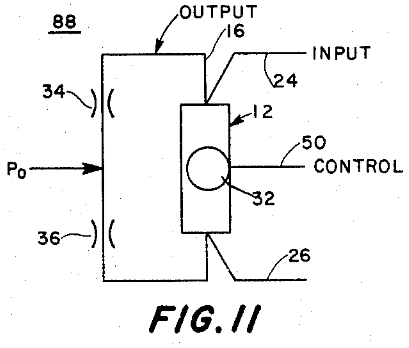

FIGURE 11 illustrates a modification 88 showing a "gate" circuit which prevents or permits the passage of a signal depending on an input to connection 50 acting as the control. In general, connection 26 is permanently closed, the input is applied at 24, a control signal is obtained at 50, and the output is at connection 16. A signal applied at 24 appears at the output connection 16 only if a signal is present at the control connection 50. The output signal persists for approximately the duration of the input signal. In general, this is merely a different interpretation of the operation of the "and" circuit of modification 32.

Figure 12:
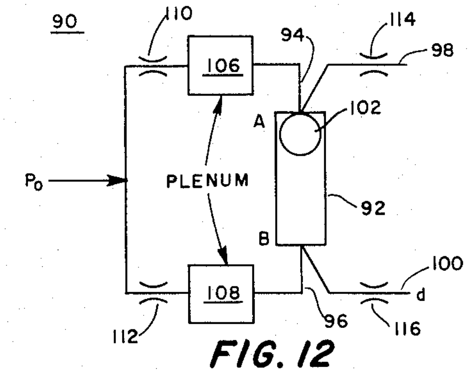
FIGURES 12 and 13 are schematic views of pneumatic computing circuits utilized as multivibrators.
Figure 13:
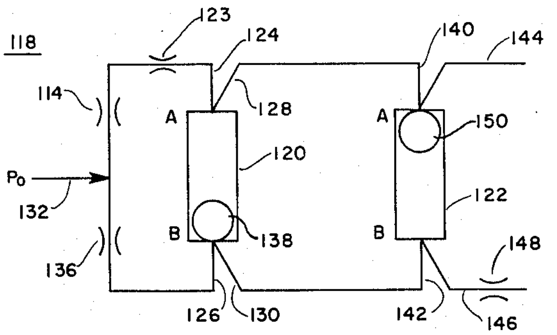

FIGURES 12 and 13 disclose a multivibrator utilizing pneumatic computing components. A multivibrator is an oscillatory circuit using one or more interconnected bistable elements. There are numerous variations of the multivibrator, however, some of the more useful types are the triggered, tuned, and free running. The tuned and free running types are continuous oscillators, while the triggered type is essentially a bistable circuit which changes state in response to a trigger pulse. In general, multivibrator oscillators belong to the class of "hard" oscillators, in that they are not normally self-starting. A tuned multivibrator has a characteristic natural frequency which is determined by the use of frequency sensitive elements in the circuit. A free-running multivibrator will oscillate at a frequency which is determined by the inherent time delays in the bistable circuits and by power supply characteristics. In general, multivibrators are used as signal generators, frequency multipliers and dividers, and for high speed switching.

FIGURE 12 discloses a tuned multivibrator 90 comprising a single bistable element 92 having axial connections 94 and 96, and radial connections 98 and 100. A ball 102 is provided within the cylindrical bistable element and adapted to assume two stable positions indicated by A and B. A pneumatic supply $P_o$ is provided suitably coupled to the axial connections 94 and 96. Similar plenum chambers 106 and 108 are provided between connections 94 and 96, respectively, and the supply $P_o$. Also, similar flow restriction orifices 110 and 112 are provided between the plenum chambers 106 and 108, respectively, and the pneumatic supply. Flow restriction orifices 114 and 116 are provided in the radial connections 98 and 100, respectively, wherein one of the flow restriction orifices is very slightly smaller than the other in order to make the circuit-self starting.

In the operation of the tuned multivibrator 90, the output is pressure pulses at axial connections 94 and 96 or flow pulsations at radial connections 98 and 100. Initially considering the circuit with the ball 102 at the midpoint of the element 92 with no supply pressure $P_o$, since the plenum chambers are equal as are the orifices 110 and 112, when pressure $P_o$ is applied, because of the difference in the size of the orifices 114 and 116, the ball will move. If orifice 116 is the smaller orifice, the ball will move to A; at this point, since the connection 94 is blocked, pressure will build-up at 94 at a rate determined by the size of the orifice 110 and the plenum chamber 106.

When the pressure at 94 has reached the condition $P_{94}A_S>P_{96}A_B$ the pressure on the area of the ball subtended by the axial seat associated with 94 will drive the ball toward B. The pressure drop across 114 due to leakage past the ball is considered to be negligible. The motion will occur rapidly since as soon as the seal between the ball and the valve seat at 94 is broken, plenum pressure is abruptly applied to the whole ball area. As soon as the ball reaches position B, pressure at 94 begins bleeding down to the basic level determined by the sizes of orifices 110 and 114. Pressure now builds up at 96, and the cycle repeats indefinitely. The frequency of oscillation is determined by the time constants of the lag circuits consisting of the orifices 112 and 114 with their plenums 106 and 108, respectively, and by the base pressure established by the series of orifice pairs 110, 114, and 112, 116.

FIGURE 13 discloses a free running multivibrator 118 having two bistable elements 120 and 122 of the type illustrated in FIGURE 1, wherein element 120 is provided with axial connections 124 and 126, and with radial connections 128 and 130. A pneumatic supply 132 is coupled to the connections 124 and 126, with an orifice 114 and 136, respectively, therebetween. A ball member 138 is provided within the bistable element adapted for movement between stable positions A and B. Element 122 is provided with axial connections 140 and 142 and with radial connections 144 and 146. An orifice 148 is provided on the connection 146, and a ball member 150 provided within the element 122 adapted to operatively assume one of two stable positions A and B. A slight constriction, 123, is provided on the connection 124 to make the circuit self-starting by preventing the ball from lying in the middle of the cylinder 120. The constriction 123 is sufficiently slight so that it asserts a negligible influence on the behavior of the unit after starting. Elements 120 and 122 are interconnected by connecting radial connections 128 and 130 with axial connections 140 and 142, respectively.

In the operation of the modification 118, starting with balls 138 and 150 at the center of their respective bistable elements and no pressure on the circuit, because of the constriction 148 at connection 146, the ball 150 is driven toward the stable position A. This movement of the ball seals axial connection 140 and interconnected radial connection 128. Pressure will build up at 124 forcing the ball 138 to the stable position B of element 120. This movement seals radial connection 130, and hence, drops the pressure below the ball 150 which then moves to the stable position B of element 122. As pressure is equalized around the ball 138, the supply pressure from 132 on the valve seat integral with connection 126 forces the ball 138 also to move to the stable position A. Connection 142 is now opened through unit 120 to supply pressure through 136, and connection 140 is closed. Hence ball 150 now also moves to position A. The cycle then repeats, returning the balls from stable positions A to stable positions B, and so on. The natural frequency of the multivibrator 118 can be determined by the basic delay characteristic of the bistable elements 120 and 122, and by the supply pressure and the size of the supply orifices 114 and 136.

The inputs considered as momentary closures of designated stable element connections, and the outputs appearing as pressure pulses at selected connections of the computing circuits disclosed have been treated as isolated signals. However, in practice, the output of one computing circuit serves as the input of a succeeding circuit. Since the outputs and inputs have both been considered to be positive pressure pulses, the transmission of pressure pulses from one circuit to another is accomplished without producing disturbing loading effects. Accordingly, FIGURE 14 illustrated a modification 152 of an "and not" logical operation instrumented by using the previously disclosed "and" circuit 32 and the "not" circuit 80.

In brief, the operation "and not" means that given two inputs X and Y, and an output W, when X and Y are both present, W will be zero. However, when either X or Y is present or when neither is present, there will be an output W. To accomplish this interconnection of the "and" and "not" circuits, a simple connection 154 is provided between 16, one of the axial connections of the "and" circuit, and 24, one of the radial connections of the "not" circuit. Also, a number of orifice bleeds are provided, a bleed 156 on the interconnection 154, and a bleed 158 on the axial connection 18. The output of the interconnected circuits is provided at the axial connection 16 in the "not" circuit. The bleed 156 serves as a coupling resistance to permit transmission of the output pressure change from the "and" unit to the "not" unit without upsetting the operation of the "not" unit by the steady or "D.C." flow from the "and" unit. The orifice bleed 158 is provided to balance the flow lost from 156.

The present application is a continuation-in-part of U.S. patent applications, Serial Nos. 63,921 and 76,413, filed on October 20, 1960, and on December 16, 1960, respectively, now abandoned.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

I claim:

1. A multiposition stable element for pneumatic computer operation comprising, in combination;

a cylinder;

a ball occupying said cylinder, substantially, but not completely sealing the cylinder, adapted to assume a plurality of stable positions, said stable positions being maintained solely by the effect of pressure and flow forces acting on the ball;

a pneumatic supply;

first and second axial connections having flow restrictive means therein, coupling opposed ends of said cylinder to said supply;

first and second valve seats formed in the opposed ends of said cylinder designed to substantially seal off the coupling to said axial connections when the ball is at a stable position over the seat; and, first and second connecting means radially coupled to said cylinder adjacent said first and second axial connections, the axial distance between each seating surface and the radial connecting means associated therewith being at most equal to the radius of said ball.

2. A device as claimed in claim 1 supplying a "nor" logic operation, wherein said first connecting means act as the output connection, including, a first flow passage containing a restrictive discharge orifice communicating with said first axial connection between the flow restrictive means therein and said first seat;

axial connecting means coupled to said second axial connection between the flow restrictive means therein and said second seat, said axial connecting means including a second flow restrictive discharge orifice; and, a third flow restrictive discharge orifice on said first connecting means acting as the output connection.

3. A device as claimed in claim 1 supplying a tuned multivibrator operation including, first and second plenum chambers in said first and second axial connections disposed between said flow restrictive means and the ends of said cylinder; and at least one flow restrictive means on one of said radial connecting means.

4. A device as claimed in claim 1 supplying a free running multivibrator wherein said device of claim 1 is the first element of said multivibrator, including, a second cylinder having a ball occupying said cylinder similar to said first cylinder;

third and fourth axial connections coupling said first and second connecting means to opposed ends of said second cylinder, and defining thereat third and fourth valve seats;

third and fourth connecting means radially coupled to said second cylinder adjacent said third and fourth axial connections, the axial distance between each of the third and fourth seats and the connecting means associated therewith being at most equal to the radius of the second ball; and, at least one flow restrictive means on one of said third and fourth connecting means.

5. A pneumatic computing circuit for a storage logic operation, comprising, in combination, a cylinder;

a ball occupying said cylinder, substantially, but not completely sealing the cylinder, adapted to assume a plurality of stable positions, said stable positions being maintained solely by the effect of pressure and flow forces acting on the ball;

a pneumatic supply;

first and second axial connections having flow restrictive means therein, each coupling one end of said cylinder to said supply;

first and second valve seats formed in the opposed ends of said cylinder designed to substantially seal off the coupling to said axial connections when the ball is at a stable position over the seat; and, first and second connecting means radially coupled to said cylinder adjacent said first and second axial connections, the axial distance between each seating surface and the radial connecting means associated therewith being at most equal to the radius of said ball;

whereby, a momentary closure or pressure pulse applied to one of said connecting means causes a change of the position of the ball from one stable position to another producing a pneumatic pressure change at said first axial connection acting as the output connection.

6. A device as claimed in claim 5, including central connecting means radially coupled to the midpoint of said cylinder, whereby a pressure pulse is generated at said output connection only from the simultaneous momentary closure of said central and second connecting means, said device providing an "and" logic operation when said first connecting means is permanently open and a "gate" logic operation when said first connecting means is permanently closed.

7. A device as claimed in claim 5 supplying an "inclusive or" logic operation wherein said first connecting means is permanently open, including a flow passage containing a restrictive discharge orifice communicating with said first axial connection between the flow restrictive means therein and said first seat; and, axial connecting means coupled to said second axial connection between the flow restrictive means therein and said second seat, said axial connecting means including a second flow restrictive discharge orifice, whereby pressure pulses are generated at the output connection with the momentary closure of either or both said axial and second connecting means.

8. A device as claimed in claim 5 supplying a "not" logic operation including flow restrictive means on said second connecting means whereby when no input is applied to said first connecting means, the ball will normally be disposed so as to provide an output signal shifting its position upon the momentary closing of said first connecting means, providing no signal when a signal is applied to said first connecting means.

References Cited in the file of this patent

UNITED STATES PATENTS

| | | |
|---|---|---|
| 2,265,117 | Seymour | Dec. 2, 1941 |
| 2,807,280 | Kittredge | Sept. 24, 1957 |

OTHER REFERENCES

Gilovich: Hydraulic Positioning System, IBM Technical Disclosure Bulletin, vol. 1, No. 4, December 1958. (Copy available in Group 360, Class 251, Subclass 31.)